United States Patent [19]

Fujiwara et al.

[11] 4,344,293
[45] Aug. 17, 1982

[54] APPARATUS RESPONSIVE TO THE AMOUNT OF REFRIGERANT FLOW IN A REFRIGERANT FLOW IN A REFRIGERANT CIRCULATING SYSTEM

[75] Inventors: Toshitaka Fujiwara, Toyota; Teiichi Nabeta; Sigeyuki Akita, both of Okazaki; Junji Kitagawa, Aichi, all of Japan

[73] Assignees: Nippon Soken, Inc., Nishio; Nippondenso Co., Ltd., Kariya, both of Japan

[21] Appl. No.: 237,262

[22] Filed: Feb. 23, 1981

[30] Foreign Application Priority Data

Feb. 25, 1980 [JP] Japan .................................. 55-23012

[51] Int. Cl.³ ........................ F25B 49/00; G01R 27/26
[52] U.S. Cl. ....................................... 62/126; 62/129; 324/61 QL; 331/65
[58] Field of Search ........................ 62/125, 126, 129; 324/61 QS, 61 R, 60 C, 61 QL; 73/861.08, 861.14; 331/65, 57, 111, DIG. 3

[56] References Cited

U.S. PATENT DOCUMENTS 2,349,992  5/1944  Schrader ................... 324/61 QL
3,059,443  10/1962  Garner ....................... 62/129 X
3,078,709  2/1963  Clark ...................... 73/861.08 X
3,391,547  7/1968  Kingston ..................... 62/126 X
4,011,500  3/1977  Pelletier et al. .............. 324/61 R
4,167,858  9/1979  Kojima et al. .
4,288,741  9/1981  Dechene et al. ............... 324/61 R

FOREIGN PATENT DOCUMENTS 52-16743  2/1977  Japan .

Primary Examiner—Albert J. Makay
Assistant Examiner—Harry Tanner
Attorney, Agent, or Firm—Cushman, Darby & Cushman

[57] ABSTRACT

An apparatus responsive to the amount of refrigerant flow in a refrigerant circulating system includes a sensing capacitor mounted in a refrigerant passage, the capacitance of the sensing capacitor being varied depending on a change in the dielectric constant of the refrigerant which in turn being dependent on the amount of the refrigerant. The sensing capacitor forms an element of a resistance-capacitance oscillatory circuit and it also forms a ring oscillator together with another capacitor and a plurality of inverters and resistors. The oscillation frequency of the ring oscillator is detected to determine the amount of the refrigerant flowing through the refrigerant passage.

5 Claims, 9 Drawing Figures

APPARATUS RESPONSIVE TO THE AMOUNT OF REFRIGERANT FLOW IN A REFRIGERANT FLOW IN A REFRIGERANT CIRCULATING SYSTEM

BACKGROUND OF THE INVENTION

The present invention relates to an apparatus responsive to the amount of refrigerant flow in a refrigerant circulating system for refrigerating purposes, for example, which is designed for use in air conditioners such as automobile coolers.

Refrigerant circulating systems which have heretofore been used for refrigerating purposes are usually of the type in which a compressor, a condenser, a pressure regulator and an evaporator are interconnected by a refrigerant pipeline and a refrigerant is sealed in the system. For use with this type of systems several methods have been proposed for the purpose of detecting the amount of refrigerant flow to prevent a decrease in the cooling capacity of the refrigerator or damage to the refrigerator due to the leakage of the refrigerant. These known methods include the use of refrigerant flow detecting apparatus designed to electrically detect a change in the dielectric constant in the refrigerant passage, for example, disclosed in Japanese Laid-Open Publication No. 16743/77.

However, these known refrigerant flow detecting apparatus of the dielectric constant responsive type are disadvantageous in that a change in the dielectric constant is small as compared with a change in the amount of refrigerant flow and this requires an increase in the size of a dielectric constant sensor, an increase in the amplification factor and accuracy of the electric circuit and the like, thus requiring an increase in the size and complexity of the apparatus or the use of expensive components.

SUMMARY OF THE INVENTION

It is the object of this invention to provide a refrigerant deficiency detecting apparatus which overcomes the foregoing deficiencies in the prior art, is small in size, has a high degree of accuracy in operation and is practical.

The main feature of this invention may be briefly summarized as follows. When the refrigerant used in a refrigerant circulating system is in gas form, its dielectric constant $\epsilon$ differs from that when it is in liquid form. In the case of Freon-12 (F-12), for example, $\epsilon_g \approx 1.0$ when it changes to a gas and $\epsilon_l \approx 2.0$ when it changes to a liquid. If the refrigerant is in the form of a gas-liquid mixture, its dielectric constant varies in dependence on the gas-liquid ratio. In accordance with this invention, to sense the dielectric constant of a refrigerant, a sensing capacitor comprising a pair of electrodes is disposed in a refrigerant passage and a special resistance-capacitance oscillator circuit designed to use the sensing capacitor as a displacement capacitor is connected to it. The resistance-capacitance oscillator circuit comprises a plurality of inverters, resistors and capacitors and its oscillation frequency varies considerably with small changes in the capacitance of the sensing capacitor. The amount of refrigerant flow is indicated to the outside by a display, an indicator or any other output device which is responsive to the oscillation-frequency.

DESCRIPTION OF THE PREFERRED EMBODIMENTS

The present invention will now be described in greater detail with reference to the illustrated embodiments.

Figure 1:
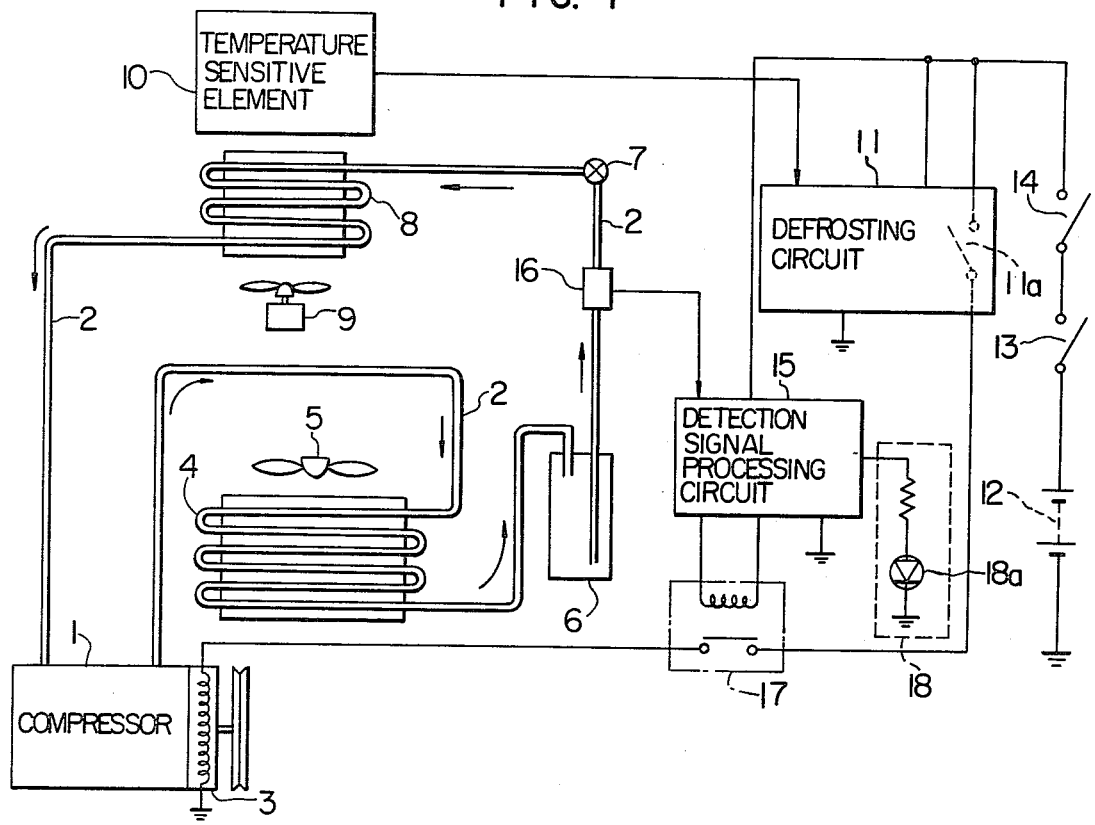
FIG. 1 is a schematic diagram showing the overall construction of an embodiment of the present invention.

Referring to FIG. 1, there is illustrated a schematic diagram showing the overall construction of an embodiment of this invention which is applied to a cooling refrigerant circulating system of an automobile air conditioner. In the Figure, numeral 1 designates a compressor for forcedly circulating the refrigerant in a pipeline 2 in the directions shown by arrows, and the compressor 1 is driven by a vehicle engine (not shown) via an electromagnetic clutch 3. Numeral 4 designates a condenser so designed that the refrigerant flowing therethrough is cooled by a cooling fan 5 which is operated by the engine or an electric motor. Numeral 6 designates a receiver, and 7 a temperature responsive expansion valve. Numeral 8 designates an evaporator disposed in an air conditioner duct (not shown) so that the air supplied from an electric blower 9 is cooled and supplied into the vehicle compartment. These units 1 to 9 provide a known refrigerant cycle.

Numeral 10 designates a temperature sensitive element (e.g., a thermistor) for sensing the temperature of the air blown from the evaporator 8, which is connected to a known type of defrosting circuit 11 so that when the temperature of the blown air sensed by the temperature sensitive element 10 is lower than a predetermined value, the defrosting circuit 11 opens an output-stage relay 11a so as to cut off the supply of power to the electromagnetic clutch 3 from a power supply battery 12 (supply voltage $+V_B$) and the compressor 1 is stopped. Numeral 13 designates a key switch of the vehicle, such as, an ignition switch, and 14 an air conditioner actuating switch. When the switches 13 and 14 are closed, the power is supplied to the entire apparatus including the electromagnetic clutch 3 and the defrosting circuit 11 as well as a detection signal processing circuit 15 which will be described later.

The detection signal processing circuit 15 and a refrigerant flow sensor 16 form a principal part of this invention such that when the detection signal applied from the sensor 16 is indicative of deficiency of the refrigerant, a relay 17 is operated and its contacts are opened to disable the operation of the compressor 1. The processing circuit 15 further turns on a light-emitting diode 18a of an indicator 18 and thereby alerting the driver to the low refrigerant.

Figure 2:
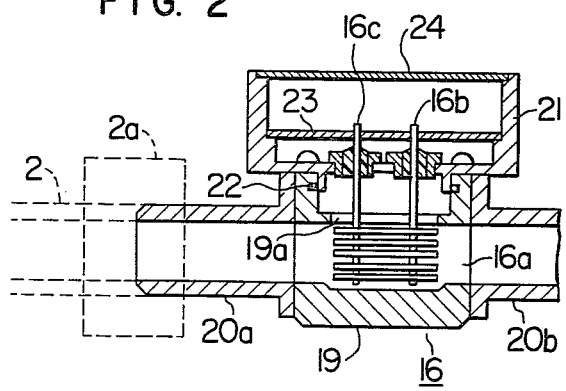
FIG. 2 is a longitudinal sectional view showing the mechanical construction of the refrigerant flow sensor shown in FIG. 1.
Figure 3:
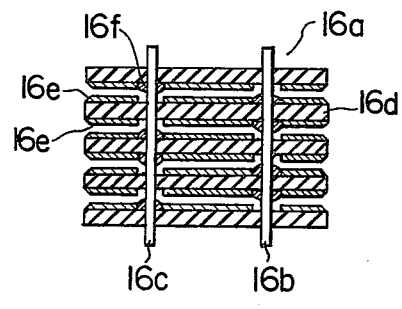
FIG. 3 is a longitudinal sectional view showing in detail the construction of the sensing capacitor shown in FIG. 2.

FIGS. 2 and 3 show in detail the construction of the refrigerant flow sensor 16. In FIG. 2, a sensing capacitor 16a comprising a pair of electrodes is mounted in a mounting block 19 which is made of a metallic material such as brass and joined with mounting pipes 20a and 20b by soldering or the like, and the block 19 is connected to a part of the pipeline 2 by a known type of joint 2a. The metallic block 19 is formed with an opening 19a through which the sensing capacitor 16a is inserted, and fixedly mounted above the opening 19a with an O-ring 22 is a holder 21 which is made of brass or the like and adapted to mechanically support the sensing capacitor 16a and contain the electric circuits therein. The two electrodes of the sensing capacitor 16a are connected to hermetically sealed electrodes 16b and 16c which are in turn closely fitted in the holes formed in the holder 21 such that each of the electrodes 16b and 16c is electrically connected to and supports the sensing capacitor 16a at its one end and the other ends are also connected electrically to associated one of the circuits on an electric circuit mounting printed circuit board 23 which is fixedly mounted within the holder 21. Numeral 24 designates a cover placed to enclose the upper open end of the holder 21.

As shown in FIG. 3, the sensing capacitor 16a is firmly fitted on the electrodes 16b and 16c in such a manner that a plurality of disk-shaped electrically insulating bases 16d (made for example of phenolic resin material) are arranged in layers to form a small gap therebetween, and the electrodes 16b and 16c are alternately soldered (at 16f) to films 16e of conductive material such as copper foils applied to the surfaces of the insulating bases 16d except where the electrodes 16b and 16c passes as shown in the Figure. Thus a plurality of small capacitances are provided between the conductive films facing each other through air gaps. These capacitances are connected in parallel by means of the electrodes 16b and 16c. A composite capacitance of these parallel capacitances is sensed via the electrodes 16b and 16c. This construction has the advantage of increasing the capacitance value of the sensing capacitor 16a and also making the density of the refrigerant atmosphere flowing in the pipeline 2 uniform at the sensing section.

Figure 4:
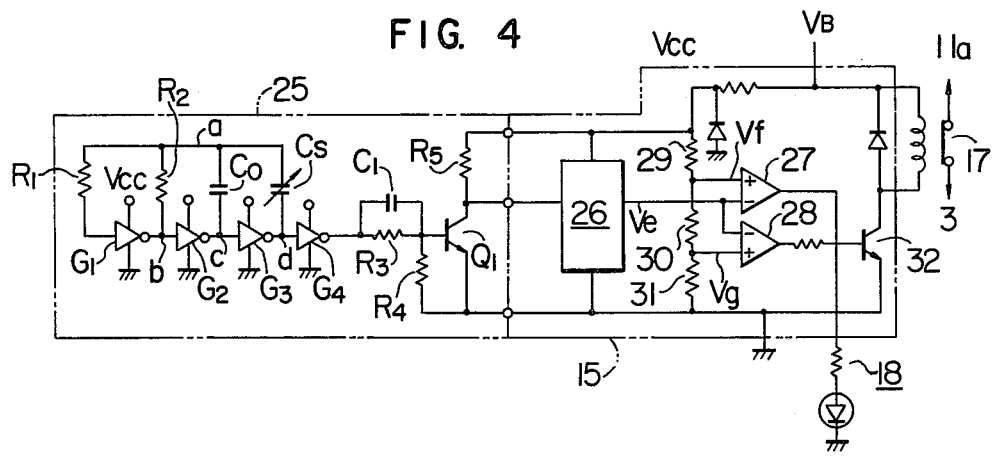
FIG. 4 is a wiring diagram showing the circuit construction of the refrigerant flow sensor and the detection signal processing circuit shown in FIG. 1.

The electric connections of the refrigerant flow sensor 16 and the detection signal processing circuit 15 are shown in FIG. 4. In the Figure, numeral 25 designates an oscillation activation circuit comprising the sensing capacitor 16a ($C_s$) of the refrigerant flow sensor 16 and the electrical elements mounted on the printed circuit board 23 within the holder 21. In the oscillation activation circuit 25, symbols $G_1$, $G_2$, $G_3$ and $G_4$ designate inverters each comprising a complementary metal oxide semiconductor or C-MOS integrated circuit and including a supply-side P-channel transistor and a ground-side N-channel transistor, $R_1$ and $R_2$ resistors, and $C_o$ and $C_s$ first and second capacitors of which the second capacitor is the sensing capacitor 16a in this embodiment. A closed circuit is formed by the first inverter G, the resistor $R_1$ and the resistor $R_2$ with which is connected in parallel a series circuit comprising the second inverter $G_2$ and the first capacitor $C_o$ and a series circuit comprising the third inverter $G_3$ and the second capacitor $C_s$ or the sensing capacitor is connected in parallel with the first capacitor $C_o$, thus forming a resistance-capacitance type oscillator circuit. Symbol $Q_1$ designates a transistor, $R_3$, $R_4$ and $R_5$ resistors, and $C_1$ a capacitor. These elements form a waveform reshaping circuit.

The oscillation frequency of this oscillator circuit varies successively with variations in the capacitance value ($C_s'$) of the second capacitor $C_s$. When the refrigerant in liquid form passes the sensing capacitor 16a, its dielectric constant $\epsilon_l$ is about 2.0 so that the capacitance value increases and the oscillation frequency is increased. On the contrary, when the refrigerant in gas form passes, the dielectric constant becomes about 1.0 so that the capacitance value decreases and the oscillation frequency decreases. When the refrigerant is a mixture of liquid and gas, its dielectric constant $\epsilon$ (l, g) assumes a value which is intermediary between 1.0 and 2.0 and the oscillation frequency is determined correspondingly.

The function of the resistance-capacitance oscillator circuit will be described in detail in connection with the description of the operation of the apparatus which will be described later.

In the detection signal processing circuit 15 shown in FIG. 4, numeral 26 designates a known type of frequency-to-voltage conversion circuit which generates at its output terminal a DC voltage corresponding to the oscillation frequency from the oscillation activation circuit 25. Numerals 27 and 28 designate comparators for comparing the DC voltage with reference voltages $V_f$ and $V_g$ which are determined by voltage dividing resistors 29, 30 and 31. The comparison reference voltage $V_f$ of the first comparator 27 which controls the indicator 18, is selected higher than that $V_g$ of the second comparator 28 which controls the relay 17. Numeral 32 designates a transistor which is controlled by the second comparator 28 to operate the relay 17.

With the construction described above, the operation of the embodiment will now be described. Firstly, when the amount of refrigerant flow is sufficient in the refrigerant circulating system shown in FIG. 1, the refrigerant flowing through between the electrodes of the sensing capacitor 16a of the refrigerant flow sensor 16 is in liquid form so that its dielectric constant $\epsilon_l$ is about 2.0 and thus the variable capacitance $C_s'$ of the second capacitor $C_s$ shown in FIG. 4 increases or becomes $C_s' = \epsilon_l \times C_s$. In this condition, the resistance-capacitance oscillator circuit operates as follows. Namely, if the capacitance value $C_s'$ of the second capacitor $C_s$ is greater than the constant capacitance value $C_o'$ of the first capacitor $C_o$, the circuit operates in the similar manner as the ordinary ring oscillator. Thus, when the output level of the inverter $G_3$ changes from "0" to "1," the voltage level at a point a momentarily goes near to "1," thus causing the output voltage of the inverter $G_1$ to change from "1" to "0," the output voltage of the inverter $G_2$ from "0" to "1" and the output voltage of the inverter $G_3$ from "1" to "0." When this occurs, the voltage level at the point a momentarily goes near to "0" and the inverters $G_1$, $G_2$ and $G_3$ are again caused to change their states. This on-off operation is repeated to produce oscillations and the oscillation period approaches a short value which is determined by the transmission time lag of the inverters. In other words, the oscillation frequency is high. In this case, the DC voltage $V_e$ appearing at the output terminal of the frequency-to-voltage conversion circuit 26 becomes higher than the reference voltages $V_f$ and $V_g$ of the first and second comparators 27 and 28 and the output levels of the comparators 27 and 28 go to "0." As a result, the indicator 18 is not turned on and the relay 17 is not energized holding its normally closed contacts in the closed position. Thus, the defrosting circuit 11 controls the energization and deenergization of the compressor driving electromagnetic clutch 3.

When the flow of the refrigerant in the refrigerant circulating system decreases due to the leakage, the liquid refrigerant passing the sensing capacitor 16a decreases so that the capacitance $C_s'$ of the second capacitor $C_s$ shown in FIG. 4 becomes $C_s' = \epsilon(1, g) \times C_s$ and this is smaller than that obtained when the refrigerant is entirely in liquid form. This decrease is proportional to a decrease in the amount of the liquid refrigerant. The capacitance value $C_o'$ of the first capacitor $C_o$ is selected equal to that capacitance value of the second capacitor $C_s$ which corresponds to a certain decrease in the liquid refrigerant.

Figure 5:
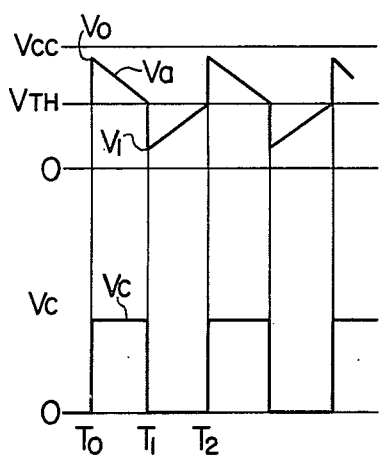
FIG. 5 is a timing diagram of the signal voltages which are useful for explaining the operation of the circuits shown in FIG. 4.

Thus, when a relation $C_s' > C_o'$ occurs between the two capacitance values, the resistance-capacitance oscillator circuit operates as indicated by the waveforms shown in FIG. 5 and its oscillation frequency decreases with a decrease in the value of $C_s'$. Assuming that at the time $t = T_o$ the output voltage $V_c$ of the second inverter $G_2$ goes to the "1" level (see FIG. 5) and the output voltage $V_d$ of the third inverter $G_3$ goes to the "0" level, the first and second capacitors are biased in the opposite directions by the input and output voltages of the third inverter $G_3$. As a result, the voltage $V_a$ of the first capacitor $C_o$ is cancelled partially by the voltage of the second capacitor $C_s$ to a value $V_o$ which is lower than the sum of a DC voltage $V_{cc}$ and an inverter threshold voltage $V_{TH}$. Thus, the differential current flows via the closed circuit formed by the first capacitor $C_o$, the resistor $R_2$, the ground-side N-channel of the inverter $G_1$, the DC power supply and the supply-side P-channel of the inverter $G_2$ and the closed circuit formed by the first and second capacitors $C_o$ and $C_s$, the ground-side N-channel of the third inverter $G_3$, the DC power supply and the supply-side P-channel of the second inverter $G_2$, and the voltage $V_a$ across the first capacitor $C_o$ decreases gradually along with the passage of the time t. In this case, the output voltage of the second inverter $G_2$ remains at the "1" level.

When the time t reaches $T_1$, the voltage $V_a$ drops to the threshold voltage $V_{TH}$ so that the output voltage $V_b$ of the first inverter $G_1$ goes to the "0" level, the output voltage $V_c$ of the second inverter $G_2$ to the "1" level and the output voltage $V_d$ of the third inverter $G_3$ to the "0" level. As a result, as mentioned previously, the voltage $V_a$ of the first capacitor $C_o$ is cancelled partially by the voltage of the second capacitor $C_s$ and it changes from the voltage $V_{TH}$ to a value $V_1$ which is higher than $-V_{TH}$. Thus, the differential current flows through the closed circuit formed by the DC power supply, the supply-side P-channel of the first inverter $G_1$, the resistor $R_2$, the first capacitor $C_o$ and the ground-side N-channel of the second inverter $G_2$ and the closed circuit formed by the DC power supply, the supply-side P-channel of the third inverter $C_3$, the second and first capacitors $C_s$ and $C_o$ and the ground-side N-channel of the second inverter $G_2$, and the voltage $V_a$ across the first capacitor $C_o$ increases gradually with the passage of the time t. In this case, the output voltage of the second inverter $G_2$ remains at the "0" level.

Figure 6:
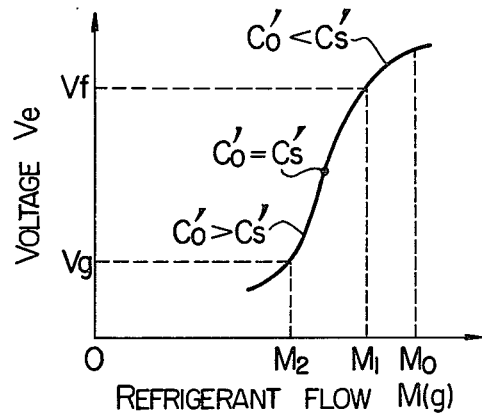
FIG. 6 is a graph showing a relation between the refrigerant flow M and the intermediate generated voltage $V_e$ for explaining the operating characteristics of the electric circuits shown in FIG. 4.

When the time t reaches $T_2$, the voltage $V_a$ rises to the threshold value $V_{TH}$ so that the output voltage $V_b$ of the first inverter $G_1$ goes to the "1" level, the output voltage $V_c$ of the second inverter $G_2$ to the "0" level and the output voltage $V_d$ of the third inverter $G_3$ to the "1" level. When this occurs, the voltage $V_a$ across the first capacitor $C_o$ changes to a value $V_o$ which is lower than $(V_{CC} + V_{TH})$ in the same manner as mentioned previously. Thereafter, this process is repeated and thus the oscillation activation circuit produces oscillations at a period $(T_2 - T_o)$. Since the magnitude of the voltage $V_a$ varies in dependence on the magnitude of the capacitance value $C_s'$ of the second capacitor $C_s$, the oscillation frequency varies so that the DC voltage $V_e$ produced by the frequency-to-voltage conversion of the frequency-to-voltage conversion circuit 26 is varied in accordance with such characteristic as shown in FIG. 6 with respect to the amount of the refrigerant sealed in the refrigerant circulating system.

Thus, when the amount of refrigerant flow reaches a value $M_1$ which is smaller than the normal sealed amount $M_o$ by a predetermined value, the DC voltage $V_e$ becomes lower than the reference voltage $V_f$ and the output voltage of the first comparator 27 changes to the "1" level. As a result, the indicator 18 is now energized and it turns on. When the refrigerant flow decreases further to the value of $M_2$, the DC voltage $V_e$ becomes lower than the reference voltage $V_g$ and the output voltage of the second comparator 28 also changes to the "1" level. As a result, the transistor 32 is turned on and the relay 17 is energized thus opening its normally-closed contacts. When this occurs, the electromagnetic clutch 3 is deenergized so that the compressor 1 is stopped and the operation of the refrigerant circulating system is stopped. Thus, by effecting the indication and the stoppage of the refrigerant circulating system operation at the two different stages, it is possible to give an early warning for replenishment of refrigerant by the indication at the first stage and to protect the refrigerant circulating system from damage by its forced stoppage at the second stage.

It should be noted that the desired effect can be produced by only one or the other of the indication and the stoppage of the system operation if occasion demands.

Figure 7:
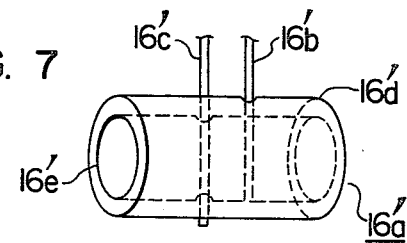
FIG. 7 is a perspective view showing another form of the sensing capacitor of the refrigerant flow sensor.

The objective of this invention can also be accomplished by the following modifications. For example, a sensing capacitor 16a' shown in FIG. 7 may be disposed in the refrigerant passage of the refrigerant circulating system. In the Figure, numerals 16b' and 16c' designate hermetically sealed electrodes of the same type shown in FIG. 2, and 16d' and 16e' cylindrical metal electrodes. A capacitance is provided between the inner side of the outer electrode 16d' and the outer side of the inner electrode 16e', and an electric connection is made between the electrode 16b' and the inner electrode 16e' and between the electrode 16c' and the outer electrode 16d'. In this case, a part of the refrigerant pipeline may be used as the outer electrode. Also, where a stratified electrode structure is used as shown in FIGS. 2 and 3, the electrodes may be formed into any other shape than the disk shape.

While, in the oscillation activation circuit 25, the second capacitor $C_s$ is used as the sensing capacitor, it is possible to use the first capacitor $C_o$ as the sensing capacitor and to reverse the input polarities of the comparators 27 and 28 and reverse the magnitudes of their reference voltages so as to cause the comparators to successively detect the oscillation frequency increasing with decrease in the amount of refrigerant flow.

Figure 8:
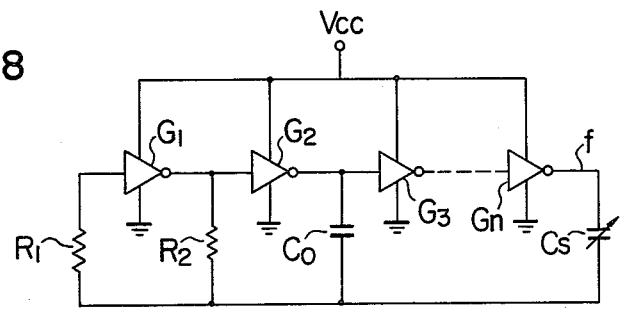
FIGS. 8 and 9 are wiring diagrams showing another forms of the resistance-capacitance oscillator circuit connected to the sensing capacitor.

While, in the above-described embodiment, the oscillation circuit includes the single inverter $G_3$ connected between the terminal c of the capacitor $C_o$ and the terminal d of the capacitor $C_s$, the inverter $G_3$ may be replaced with an odd number of inverters $G_3$ to $G_n$ as shown in FIG. 8 to obtain the same functional effect as in the case of the previously described embodiment.

Figure 9:
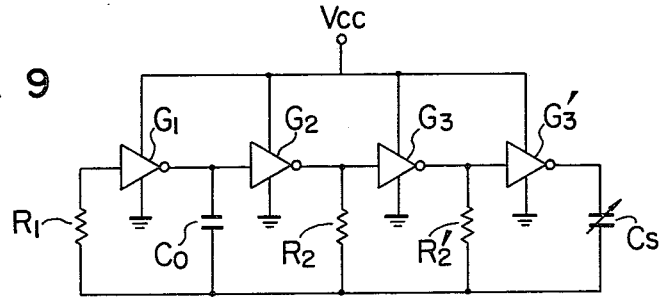

FIG. 9 shows a modification of the above-described embodiment, in which a closed circuit is formed by the first capacitor $C_o$, the resistor $R_1$ and the inverter $G_1$, a series circuit of the resistor $R_2$ and the inverter $G_2$ is connected in parallel with the first capacitor $C_o$, a series circuit of the inverter $G_3$ and the resistor $R'_2$ is connected in parallel with the resistor $R_2$ and a series circuit of an inverter $G_{3'}$ and the second capacitor $C_s$ is connected in parallel with a resistor $R_{2'}$. In accordance with this modification, when the DC voltage $V_{CC}$ is applied from the DC power supply to each of the inverters, the capacitors $C_o$ and $C_s$ are biased in the opposite directions by the input and output voltages of the inverters $G_2$, $G_3$ and $G_{3'}$ which are odd in number, thus producing essentially the same functional effect as explained in connection with the above-described embodiment.

Further, each of the inverters may be comprised of a transistor instead of an integrated circuit.

Further, while, in the above-described embodiment, the detection signal processing circuit 15 comprises the frequency-to-voltage conversion circuit and the voltage comparison circuit, the circuit 15 may be combined with a detecting circuit including a digital or analog counting circuit for repeatedly counting the number of pulse signals applied in a unit time from the oscillation activation circuit 25 so as to generate an output signal when the count value attains a predetermined value.

Further, in the above described embodiment, the detection signal processing circuit 15 may include a plurality of comparators with different reference voltages so as to detect the amount of refrigerant flow at many points and indicate the refrigerant flow at a plurality of levels, for example.

On the other hand, where the flow of refrigerant remains unstable during several tens of seconds after starting the operation of the refrigerant circulating system and the refrigerant flow sensor is disposed for example in a part of the refrigerant pipeline, the refrigerant flow sensor may possibly indicate a value which is different from that of the refrigerant flowing past the refrigerant flow sensor in the stable flow condition. In such cases, in order to prevent the output unit from coming into operation during several tens of seconds after the energization of the compressor driving electromagnetic clutch 3, a timer circuit may be additionally provided so as to forcibly apply the supply voltage $V_{cc}$ to the output terminal of the frequency-to-voltage conversion circuit 26 and thereby to prevent any erroneous indication and any erroneous stoppage of the refrigerant circulating system.

Still further, while, in the above-described embodiment, the output unit gives an indication and stops the operation of the refrigerant circulating system in response to decrease in the amount of refrigerant flow, noting the fact that the cooling capacity of the evaporator 8 decreases with decrease in the amount of refrigerant flow, in the case of a ventilating unit including the evaporator 8 of the automobile air conditioner, a heating heat exchanger having an adjustable capacity (a heat exchanger is known which utilizes the cooling water of the automobile engine as a source of radiant heat and which includes a mixture ratio adjusting damper for adjusting the amount of air flowing through the bypass of the heat exchanger) may be positioned downstream of the evaporator 8 in addition to an electric control unit adapted to automatically control the heating capacity in accordance with the temperatures inside and outside the vehicle compartment, whereby the adjusting output of the electric control unit is corrected in accordance with the amount of refrigerant flow.

Still further, instead of stopping the operation of the refrigerant circulating system, a sounder (e.g., a buzzer) which is capable of making a relatively rich sound may be used.

It will thus be seen from the foregoing that the present invention has a great advantage that by virtue of the use of a small oscillator circuit whose oscillation frequency varies successively in accordance with the amount of refrigerant flow, an apparatus is provided which is small in size and responsive with a high degree of accuracy to the amount of refrigerant flow, thus ensuring an accurate operation.

We claim:

1. An apparatus responsive to the amount of flow of a refrigerant in a refrigerant circulating system, said apparatus comprising:

sensing capacitor means including a pair of electrodes and disposed in a portion of a refrigerant passage of said refrigerant circulating system;

a resistance-capacitance oscillator circuit including said sensing capacitor means as a displacement capacitor, said resistance-capacitance oscillator circuit forming a ring oscillator including a plurality of inverters, a plurality of resistors and first and second capacitors, said first capacitor forming said sensing capacitor means and said second capacitor having a predetermined capacitance value being biased in opposite directions to each other by input and output voltages of at least one of said inverters; and output means responsive to oscillation frequencies of said resistance-capacitance oscillator circuit.

2. An apparatus according to claim 1, wherein said resistance-capacitance oscillator circuit comprises a closed circuit including first one of said inverters and one of said resistors, a first series circuit including second one of said inverters and said first capacitor and connected in parallel with said one resistor, and a second series circuit including third one of said inverter and said second capacitor and connected in parallel with said first capacitor, wherein either said first capacitor or said second capacitor forms said sensing capacitor means, and wherein said capacitors are biased in opposite directions to each other by input and output voltages of said third inverter when a DC supply voltage is applied to each of said invertors.

3. An apparatus according to claim 1, wherein said sensing capacitor means includes a plurality of flat plate electrodes substantially parallel to said refrigerant passage and arranged in layers.

4. An apparatus according to claim 1, wherein said output means includes two activation means responsive to the oscillation frequencies of said resistance-capacitance oscillator circuit and operable in response to at least two of said oscillation frequencies.

5. An apparatus according to claim 4, wherein said two activation means include indicator means and means for stopping the operation of said refrigerant circulating system.

* * * * *